Feb. 12, 1952 — F. J. SOMERS — 2,585,865
FILM SCANSION APPARATUS
Filed Feb. 6, 1948 — 2 SHEETS—SHEET 1
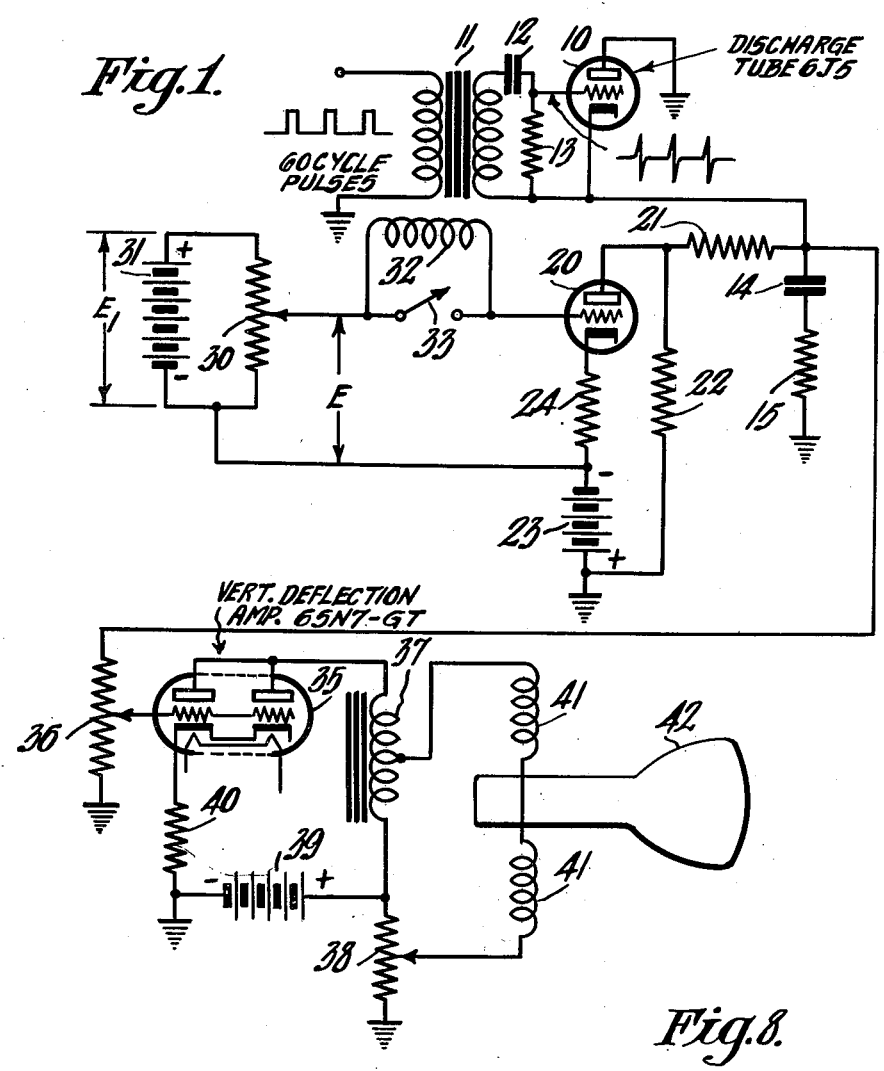
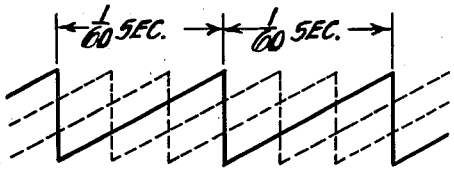
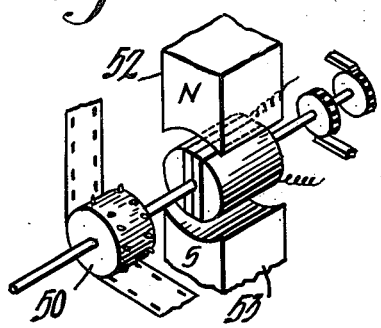
INVENTOR
Frank J. Somers
BY
ATTORNEY Feb. 12, 1952     F. J. SOMERS     2,585,865
FILM SCANSION APPARATUS
Filed Feb. 6, 1948     2 SHEETS—SHEET 2
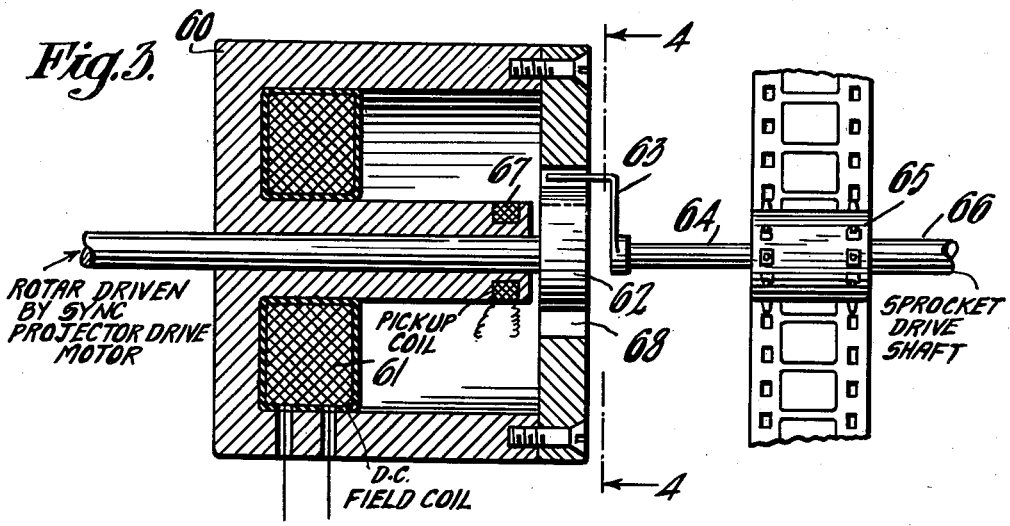
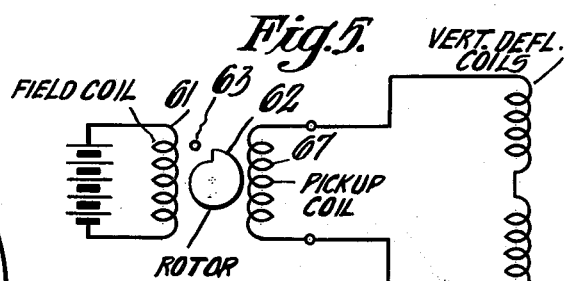
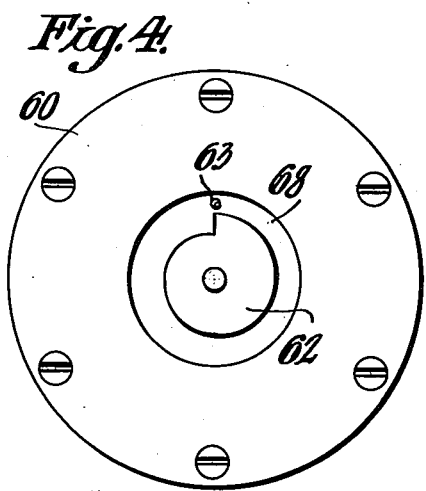
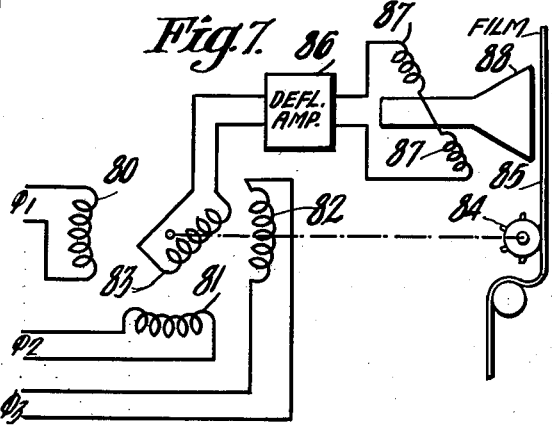
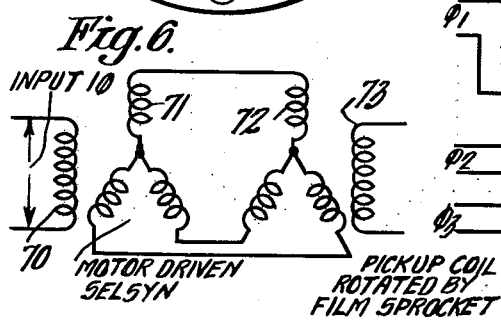

UNITED STATES PATENT OFFICE 2,585,865

FILM SCANSION APPARATUS

Frank J. Somers, Rockville Centre, N. Y., assignor to Radio Corporation of America, a corporation of Delaware Application February 6, 1948, Serial No. 6,766

14 Claims. (Cl. 178—7.2)

The invention relates, in general, to television apparatus and, more particularly, to such apparatus as is used in scanning motion picture films.

In the art of scanning pictures or images which have been furnished by a motion picture projector for television purposes, there have been used, in general, in the prior art to which this invention belongs, two outstanding methods or systems of developing electrical signals which are representative of the optical values of individual points of images recorded on the picture film. In both of these methods or systems, the scene to be transmitted has been directed onto a photo-emissive area or mosaic and the resulting electrical image so formed is methodically explored by electronic means, one narrow line or strip at a time, in the scanning process. In the first of these systems and methods, the film has been masked from the photo-emissive mosaic except at selected intervals, at which time light has been projected through the film to direct a recorded frame of the image on the film onto the photo-emissive area or mosaic and the scansion of the mosaic has been accomplished during the intervals when the light from the film is masked from the mosaic. This is possible due to the fact that the scansion tube used has been, in this system, of the so-called "storage" type of tube such, for instance, as the Iconoscope.

In the storage type of tube, signals are developed by scanning the photo-emissive mosaic with an electron beam, line by line, and at least partially neutralizing the charges on the mosaic which have resulted from the emission of the electrons therefrom under the impetus of the light which has been directed onto it. An intermittent type of projector may be used with the storage type of scansion arrangement and film pull-down is accomplished during the time when the projection of light through the film is masked from the photo-emissive mosaic. Scansion of the mosaic by the scanning beam also is accomplished during the same black-out interval.

In the second of these systems and methods, a non-storage type of scansion tube has been employed and only the light falling upon an element of the photo-emissive area at the instant that the area is being scanned is effective in producing a signal. In this system, for every instant that the signal is transmitted the film projector must supply a light image to at least a part of the photo-emissive mosaic, although not necessarily from the entire frame of the picture. This means that ordinarily an intermittent type of projector cannot be used and heretofore the problem of changing the frames of the film producing the optical image to be televised has had for a solution the use of a so-called continuous projector.

This is a type of projector in which the film projection is never masked from the photo-sensitive mosaic and registration of the frames of the optical image being televised is attempted by the use of a complex optical system. The film itself is moved continuously and hence lacks the type of intermittent motion that takes place when the film is used with the so-called intermittent projector such as is generally used with the first system described. The use of a continuous projector, however, has had serious disadvantages.

In the first place, the projector uses a complex and expensive optical system which does not always prove satisfactory in operation. In the second place, light losses in a continuous projector are great, and in the third place, film shrinkage must be compensated for and this shrinkage is never the same for any two reels of film. This means then that continuous readjustments must be made and accurate adjustments under these circumstances are almost impossible. It is an object of the present invention, therefore, to provide a scanning system in which these disadvantages will be overcome.

The normal exposure rate of motion picture film is 24 frames per second and the normal scansion rate in present day television transmission is 60 interlaced fields per second. Each frame of the film, therefore, must be scanned more than once to provide the required number of scanned fields and this problem has been solved by scanning the even frames twice and the odd frames three times or vice versa. A discussion of the use of motion picture film with television apparatus may be found in the July 1939 issue of the Journal of the Society of Motion Picture Engineers in an article entitled "Application of Motion Picture Film to Television" by Engstrom et al. and appearing on page 3 et seq. thereof. A discussion of the continuous type of film scansion also appears in an article in the same edition by Goldmark and entitled "A Continuous Type Television Film Scanner."

With the inherent advantages of an intermittent type of projector, it has been attempted heretofore to use such a projector with a non-storage type of scansion tube. If the conventional intermittent machine is used, however, and the film is scanned during its exposure interval to the photo-sensitive element of the tube, the pull-down time for the film has to be of the order of 8 per cent of 1/60 of a second. This is a prohibitively short pull-down interval, and would demand a film acceleration of such an extent that the sprocket holes of the film would be subjected to such stresses that the material around the sprocket holes of the film would be torn. It is another of the objects of the present invention therefore, to provide a film scansion apparatus for use with television in which an intermittent type of projector may be used with a non-storage type of photo-electric element without the disadvantage set forth immediately hereinbefore.

Attempts have been made previously to use an intermittent projector with a non-storage type of photo-emissive element in a film scansion system and to avoid the difficulties set forth in the previous paragraph by scanning the film while at rest, and also scanning the film during the pull-down period and allowing the mechanical motion of the film to contribute to the scanning process. Associated with the film and the photo-emissive element has been a cathode ray tube whose beam forms a spot of light on a luminescing target, and the spot is directed through the film onto the photo-emissive surface. Scansion is accomplished by a movement of the spot of light by deflection of the cathode ray beam producing it, and this has been termed the so-called "flying spot" type of scansion. The normal vertical scanning movement, however, of the spot is a linear function with respect to time, that is, the deflecting force on the beam is produced by a sawtooth wave form of electrical energy. On the other hand, the film, during the pull-down time, is both accelerated and decelerated, the film being accelerated from its stationary position to a maximum pull-down speed and then decelerated to a zero speed again to its position of rest. This means then that the vertical scanning motion of the light spot produced within the cathode ray tube producing the flying spot must bear some relationship to the speed with which the film is moving if both the scanning spot and the film are to contribute to the vertical scansion. It is an additional object of this invention to provide an apparatus of the general nature hereinbefore described in which a greater scanning accuracy may be obtained where both a flying spot and the movement of the film itself contribute to the vertical scanning.

In view of the fact that the movement of the cathode ray beam which produces the flying spot of light must bear a relationship to the movement of the film and, further, since, during the movement of the film, it is both accelerated and decelerated, it will be apparent that it would be greatly advantageous if the means for developing a compensatory wave form to affect the vertical scansion speed of the cathode ray beam could be developed by some means mechanically coupled to the film pull-down sprocket means. It is a still further object of the invention to provide an arrangement in which this is done.

It is another object of the invention to provide means in which both the normal deflecting wave for a cathode ray beam and a compensatory wave to compensate for movement of a film are provided by the same element in a system using a flying spot type of scansion produced by a cathode ray beam and this results in a simplification of the problem of producing good interlaced scanning in a system of this general nature.

It is a still further object of the invention to provide a rotating member for developing a correction potential in which the member itself has a very small mass.

My invention, in general, contemplates the provision of a cathode ray tube whose beam is deflected to form on a target member a moving spot of light which is directed through a film onto which has been recorded an image to be scanned. Associated with the so-called flying spot type of scanner is an intermittent projector and, normally, even frames of the image will be scanned twice and odd frames will be scanned three times or vice versa. Both the even and the odd frames are scanned once while the film is being pulled down to a new frame as well as being scanned while the film is at rest. This means then, that the even frames, for example, will be scanned once while static and once while moving and the odd frames will be scanned twice while static and once while moving. This allows the use of an intermittent type of projector with a non-storage type of tube.

In the preferred embodiment of my invention hereinafter described with particularity, there is provided a cathode ray tube with means for deflecting the cathode ray beam in two coordinates of movement. The beam so deflected produces on the target of the tube a spot of light of considerable brilliance and this spot is directed through the film onto a photo-electric element. The modulations of the light spot by the image on the film produce the video signals. The spot will be deflected linearly horizontally and, in scanning the film during its position at rest, the spot will be deflected vertically in a linear fashion. However since when the film is pulled down, the film itself contributes a part of the scanning movement, and further, since the film is both accelerated and decelerated during its pull-down interval, some compensation must be made for these factors which affect the vertical component of scanning. The scanning coils of the cathode ray tube may be driven by a well known form of deflection generator so that a sawtooth shaped current wave form is supplied to the coils during the time while the film is at rest and scansion takes place in a normal fashion.

Mechanically coupled to the pull-down sprocket of the device and hence driven thereby, is a small magneto and the output of the magneto is impressed onto a D. C. amplifier having a predeterminable bias supplied to the input circuit thereof and having the output circuit thereof coupled to the sawtooth wave generator furnishing current to the deflection coils. When the film is at rest the pickup coil of the magneto will have no voltage induced in it since the pull-down sprocket is static and accordingly the magneto will not affect the normal operation of the scanning oscillator. However since the pickup coil is mechanically coupled to the pull-down sprocket for the film, the voltage induced in the coil will be proportional to the speed with which it is driven and this in turn will be proportional to the speed with which the pull-down sprocket pulls the film to a new position. This induced voltage is then amplified by the D. C. amplifier and will affect the scanning wave form produced by the scanning oscillator and thus compensate and correct for the vertical component of scanning which is contributed by the movement of the film itself.

In an alternative form of my invention there is provided a pickup coil wound about one part of a magnetic yoke which is supplied by a steady D. C. field. The yoke contains an air gap in which there is interposed a vane of magnetic material and the vane is mechanically coupled to the film drive pull-down sprocket.

Also interposed in the air gap is a rotor member whose outer peripheral shape is that of an exponential curve. The rotor may be driven continuously by the synchronous motor which drives the projector.

During the time when the film is at rest only the rotor will rotate and the air gap between the yoke and the vane and the rotor will vary linearly in size and there will be induced in the pickup coil a sawtooth wave form. On the other hand, when the film is being pulled down the size of the air gap between these elements will vary in accordance with the speed with which the vane is moved and also the normal speed with which the rotor is moved. There will then be developed in the pickup coil a wave form which is essentially that of a sawtooth modified by a wave proportional to the pull-down velocity of the film. Thus during the static periods of the film, the sawtooth wave induced in the pickup coil may be used to supply vertical deflection to the flying spot scanning beam and during the dynamic periods the modified sawtooth wave form will supply the vertical deflecting drive for the beam.

In an additional alternative form of the invention, a plurality of windings are spaced apart at a pre-determined number of electrical degrees and are energized from a multi-phase source of currents.

A rotor member positioned adjacent the windings and in the field of influence thereof, may be driven by the pull-down sprocket to develop wave forms for deflecting the cathode ray beam.

When the film sprocket is not moving, that is to say, when the film is at rest, a sawtooth shaped wave will be induced in the rotor winding which, at this time, also is at rest. This sawtooth shaped wave may be used to energize the deflecting apparatus of the cathode ray tube producing the flying spot of light and to control the vertical movement of the beam.

On the other hand, while the film is being moved down, the film pull-down sprocket will be rotating and the rotor which is mechanically coupled thereto, also will be rotating at a speed which bears a definite relationship to the speed of rotation of the sprocket and, hence, the pull-down speed of the film. There will be induced then in the rotor winding a wave which is a combination of a sawtooth shaped wave and a compensatory wave which is dependent upon the film speed. Since the vertical scansion speed of the cathode ray beam must be interrelated with the pull-down speed of the film, this will be accomplished automatically by the currents generated in the moving rotor.

My invention will be understood best by a reference to the drawings in which;

Figure 1 shows one embodiment of my invention.

Figure 2 is a magneto arrangement driven by the film pull-down sprocket.

Figure 3 is an alternative form of my invention.

Figure 4 is a cross-sectional view of the arrangement of Figure 3 shown on a cutting plane normal to the axis of the device and along the line 4—4.

Figure 5 is an equivalent circuit diagram of the arrangement of Figure 3.

Figures 6 and 7 illustrate an alternative form of the invention with explanatory curves in Figure 8.

Referring to Figure 1, there is shown an embodiment of my invention. Since the horizontal sweep of the cathode ray beam producing the flying spot of light which is used for scansion purposes is fixed and substantially constant, the well-known circuits for producing the horizontal deflection potentials or currents will not be described in this specification. On the other hand, the vertical component of scanning will vary.

While the film is at rest, vertical scansion takes place in a substantially linear manner, and while the film is in motion it is both accelerated and decelerated, and, therefore, some compensation must be made for the velocity of movement of the film. An apparatus accomplishing this is shown in this figure and the arrangement is such that when the film is at rest the deflecting coils of a cathode ray tube which produces the flying spot will be energized in such a fashion that vertical deflection of the beam takes place in a linear manner. When the film is in motion, the output of the generator which furnishes potentials or currents will vary in accordance with the speed with which the film is driven and thus compensate for any film movement.

In the arrangement of this figure, there is provided a generator including a vacuum tube 10, having the secondary of a transformer 11 connected in the grid-cathode circuit thereof. Also connected in this circuit is a grid leak-condenser combination 12, 13. The anode of the tube is grounded and the cathode is connected to one terminal of a condenser 14, the other terminal of which is connected to ground through resistor 15. The space charge path of tube 10 forms a discharge path for charges stored in condenser 14 when the tube is caused to conduct.

A second tube 20 with associated apparatus, is included in a circuit for charging condenser 14. The anode of the tube is connected through resistor 21 to the terminal of condenser 14 which is connected to the cathode of tube 10. The anode also is grounded through resistor 22.

The cathode of tube 20 is connected to the negative terminal of a battery or other appropriate source of D. C. potential 23 through a degenerating resistor 24. The positive side of the potential source is grounded.

There is provided in the grid-cathode circuit of tube 20, a potentiometer 30 which is shunted across a source of D. C. potential 31. The sliding arm of the potentiometer is connected to the grid of tube 20 through pickup coil 32. The coil 32 may be an armature which is driven by the pull down sprocket of the projector through appropriate gearing and will be referred to more particularly with respect to Figure 2. The coil is shunted by a switch member 33. The negative terminal of the potentiometer is connected to the negative terminal of D. C. source 23.

Potentials appearing at one terminal of the condenser 14 are impressed onto the input circuit of a vertical deflection amplifier comprising double triode 35 through the high value input resistor 36. The double triode has the elements thereof connected in parallel.

The parallel connection of the plates of the double triode which might, for instance, be a 6SN7-GT type of tube, is grounded through inductance 37 and potentiometer resistor 38. The common terminal of elements 37 and 38 is connected to the cathodes of the deflection amplifier tube through a source of potential 39 and resistance 40.

The vertical deflection coils 41 of the cathode ray tube 42, which produces the flying spot of light used for scansion purposes, are connected to a tapped point on inductance 37 and to the slide arm of the potentiometer containing resistor 38. The operation of the device is as follows:

A direct current potential E is applied to the grid of the D. C. amplifier tube 20 in series with the voltage that is developed in the pick-up coil 32. When the film is at rest, that is when the pick-up coil is not supplying any additional voltage, the voltage E causes a proportional amplified potential to appear across resistor 22 in the plate circuit of tube 20, the potential at the junction of resistances 21 and 22 being a function of the impedance of tube 20 as determined by its bias condition.

When the tube 20 is conducting there will be a definite potential drop across resistor 22 and this will be impressed onto condenser 14 through resistors 15 and 21. The condenser then will be charged linearly by this voltage. This causes a sawtooth shaped wave to be applied to the grid of tube 35 via the size control potentiometer 36.

This in turn causes a sawtooth shaped deflecting wave to flow in the deflection coils 41 and normal deflection of the cathode ray beam in the flying spot scanner is accomplished.

The D. C. amplifier tube 20 is provided with the degenerative resistor 24 to improve the linearity of its response and likewise tube 35 is provided with the degenerative resistor 40 to improve its linearity. It is intended that the amplifying system have a high degree of linearity over its operating range and sufficient degeneration should be used to attain this end.

Capacitor 14 and resistances 15 and 21 are chosen to have a long time constant since it is intended that the rate of rise of voltage across condenser 14 be essentially a straight line during the charging thereof and during the active part of the scanning cycle.

With the provision of the degeneration and the long time constant circuit heretofore mentioned, the current flowing in the deflection coils 41 will be of linear sawtooth waveform having a slope proportional to the voltage E. This means that the velocity of scanning of the pick-up device will be linear and will be proportional to this voltage.

When the film is moving the intermittent drive sprocket will be rotated and the armature 32 of the magneto will have a voltage induced therein which is proportional to the speed of rotation of the armature, or pick-up coil, which in turn is proportional to the speed of rotation of the drive sprocket and hence of the pull down speed of the film itself. The magneto arrangement will be explained more fully hereinafter with respect to Figure 2.

The motion of the film will be opposite to the direction of the vertical motion of the flying spot and accordingly the pick-up coil or armature must be polarized so as to produce a potential which opposes the potential E. This can be accomplished by arranging the pick-up coil so that when the film is moving, the coil always moves in the same manner in the magnetic field supplied by the pole pieces of the magneto.

The output of tube 20, and hence the charging rate of condenser 14, will be proportional to the potential impressed onto the input circuit of the tube. This voltage will be linear in form when the film is at rest, but when the film moves the voltage will vary in accordance with the speed at which the film is moving since the voltage induced in the pick-up coil or armature of the magneto is proportional to this factor. This means then, that a compensation for the speed of the film has been provided which is not necessary when the film is at rest.

The number of fields of the film scanned per second will be 60 in accordance with present day standards and accordingly, the discharge tube 10 is driven to a conducting state 60 times per second by the rectangular pulses impressed on the control grid of the tube. The scanning control resistor 36 is chosen very large so that it will dissipate only a negligible portion of the charge on condenser 14.

In adjusting the system for operation, the potentiometer 36 is adjusted so that the voltage E just matches the voltage produced by the pick-up coil 32 when the film travels at such a speed that its motion is equivalent to the normal electrical scanning velocity needed when the film is at rest. When this is done, the potentiometers having resistors 36 and 38 can be adjusted individually for the proper scanning size and centering.

The switch 33 is provided so that the pick-up coil can be shorted out during the time that it is moved from the position at which it finishes when the film drive sprocket stops after changing frames of the film. The switch may be controlled by the film drive sprocket itself if desired; however, proper design of the sprocket, and mechanical drive of the coil by the sprocket, can provide an arrangement in which the pick-up coil is positioned at its initial starting position after each pull-down interval by the drive sprocket.

On the other hand, if the switch arrangement is used, the switch will short out the pick-up coil when the film comes to rest and the coil then can be returned to its starting position by means of a spring or other suitable drive means.

Referring to Figure 2 there is shown a magneto arrangement which may be used in developing potentials which are proportional to the speed of the film during the pull down interval. The film drive sprocket 50 has, attached to the shaft thereof, an armature having a soft iron core about which is wound a pick-up coil 32. The rotation of the pick-up coil in the magnetic field produced by pole pieces 52 and 53 will induce voltages in the coil which are proportional to the speed of rotation of the armature. The voltages may be taken off in well-known fashion from commutating segments and amplified, if desired, to provide a compensatory wave form as explained hereinbefore.

Referring to Figure 3 there is shown an alternative form of my invention. There is provided a core 60 of magnetic material and which may be cylindrical in cross-section along one axis and in the form of a figure E in cross-section along a cutting plane parallel to the major axis thereof. Wound about the center arm of the core are energizing coils 61 which may be energized by a source of D. C. potential.

The center arm of the core has an opening through which may be passed a drive shaft. Positioned at the end of the drive shaft is a rotor 62 of magnetic material and which may be in the shape of an exponential curve and which may be seen more clearly with reference to Figure 4. The rotor is positioned so that an air gap is formed between the outer periphery of the rotor and the cylindrically shaped housing of the magnetic yoke member.

Positioned in the air gap so formed is a vane 63, which may be iron or other suitable material, and which is of elementary cross-sectional area and which is brought out and joined to a drive shaft 64. The drive shaft 64 may be mechanically coupled to the pull-down sprocket 65 of the film projector and the sprocket itself may be driven by the drive shaft 66. The coupling may be through appropriate gear trains.

Positioned at the extremity of the center arm of the yoke member and in a slot cut therein, is a pickup coil 67. The action of the device is as follows:

The rotor drive shaft may be driven by the synchronous motor utilized to run the projector which feeds the film which is scanned by the flying spot of light. While the film is stationary the vane coupled to the pull down sprocket shaft also will remain stationary. During the rotation of the rotor, the air gap space between the rotor and the vane and the yoke will diminish due to the shape of the periphery of the rotor and due to the fact that the rotor is rotated continuously by the projector synchronous drive motor. This will mean then that the reluctance of the magnetic path through the yoke will vary and the shape of the rotor is such that it will vary linearly and accordingly a sawtooth shape waveform will be induced in the pick-up coil 67. This waveform may be used to furnish the vertical drive of the cathode ray beam used in the flying spot scanner.

On the other hand, when the film is moving, that is, when the film is pulled down, the iron vane will be rotated with a speed which is proportional to the pull down speed of the film since the vane is mechanically coupled to the film pull-down sprocket. This will mean then that no longer will the air gap space between the vane and the periphery of the rotor be changed in a linear fashion but that it will vary also in accordance with the speed of the vane. This means then that the normal waveform which is induced in the pickup coil 67 when the film is stationary will be modified in accordance with the speed at which the vane is rotating and thus the induced waveform will be the equivalent of a sawtooth waveform (as normally induced when the vane is still) and a component proportional to the speed of rotation of the pull-down sprocket of the film. This waveform then may be used to furnish the vertical drive for the cathode ray beam in the flying spot scanner. This arrangement has the advantage that no electrical switches are necessary for the operation of the apparatus.

Referring to Figure 4 there is shown a cross-sectional view of the apparatus of Figure 3 taken along a cutting plane along the line 4—4 and positioned at right angles to the drive shaft of the rotor member. The housing of the yoke member 60 is shown and has a cylindrical opening 68 in which is positioned the rotor member 62 whose peripheral shape is that of an exponential curve. The vane 63 which is positioned between the outer edge of the rotor and the edge of the cylindrically shaped portion of the yoke member is shown in one position that it may assume during the pull down interval of the film.

Referring to Figure 5 there is shown schematically an electrical equivalent circuit which illustrates the operation of the device of Figure 3. The field coil 61 which is energized by a suitable source of D. C. potential is shown with rotor 62 and vane 63 interposed in such a fashion as to vary the magnetim flux linkage with a pick-up coil 67. The output of the pick-up coil is coupled to the vertical deflection coils of the cathode ray tube supplying the flying spot of light for scansion purposes after appropriate amplification thereof.

Referring to Figure 6 there is shown an arrangement for obtaining a rotating field whose excitation is substantially saw-tooth shaped. This arrangement does not comprise the invention per se and systems of this nature have been known heretofore. A similar arrangement is disclosed, for instance, in the explanation of the S. C. R. 584 Radar set appearing in "Electronics" for February 1946, McGraw-Hill and Company, on page 115 et seq.

A single phase input is impressed onto a primary winding 70, and a Y connected set of windings 71 which are motor driven, are positioned in the field of influence of windings 70. The single phase source supplies a sawtooth shaped wave to the primary winding 70.

The coils 71 are connected to a set of stator windings 72 which also are Y connected and the result is then that there will be developed in the windings 72 a rotating multi-phase saw-tooth magnetic field. A rotor 73 is provided which is within the field of influence of windings 72. There will be induced in rotor winding 73 a wave which is the combination of a sawtooth shaped wave and a compensatory waveform representative of the speed with which the rotor is rotated. The rotor 73 is mechanically coupled to the film sprocket and when the film is at rest a sawtooth shaped wave will be induced in the rotor winding. When the rotor is revolved by the film sprocket, the combined waveform referred to above will be developed and will be representative of the speed of the film. If these waves are used to deflect a cathode ray beam in a cathode ray tube, the speed of deflection of the beam will be linear when the film is at rest and will be dependent on the film speed when the film is in motion.

Referring to Figure 7, there is shown a schematic diagram of the arrangement of my invention employing the principles illustrated in Figure 6. A source of three phase 60-cycle sawtooth waves is illustrated as having phase #1 connected to one stator member 80, phase #2 energizing a second stator winding 81 and phase #3 energizing a third stator winding 82. The 3-phase sawtooth currents may be derived by an arrangement such as illustrated in Fig. 6, if it be desired, or from any other type of 3-phase generator which will supply a wave of this particular shape. The windings are disposed a predetermined number of electrical degrees apart depending upon the number of phases used, and, in this case, they would be 120 electrical degrees apart. Disposed in a position where it will be within the field of influence of the stator windings is a rotor winding 83 which is indicated by the broken line as being mechanically coupled to one of the pull down sprockets 84 which are used in the film pull down system. Such film pull down systems are well known per se. Accordingly, only one of the sprockets associated with the pull down mechanism is illustrated here and it will be appreciated that the sprocket revolves at a speed which is proportional to the pull down speed of the film 85.

A reference to Figure 8 will show the relative shapes and times of occurrence of the 3-phase wave utilized in the illustrative arrangement.

When the winding 83 is still, there will be induced therein a 60-cycle sawtooth wave from one of the stator windings and the rotor is arranged so as to be closely adjacent one of the stator windings when this situation prevails. This has not been illustrated in the drawing in Figure 7 since at one time the rotor will be motionless when the film is at rest and it will be rotating at another time when the film is moving. It is in one of the latter positions that the rotor has been illustrated to show how it can come within the field of influence of more than one of the stator windings. The sawtooth wave induced in the rotor when the film pull down sprocket is motionless may be used with the vertical deflection coils of the cathode ray tube producing the flying spot of light to linearly deflect the spot and this is the manner in which deflection will be accomplished when the film is not moving.

On the other hand, when the film is moving, the film itself contributes to the scanning motion and it is during this period that compensation must be made for the film motion. It is during this period also that the rotor is revolving and there will be induced therein currents whose values bear a relationship to the speed with which the rotor revolves and this, in turn, will be proportional to the film pull down speed since the rotor is mechanically coupled to the film pull down sprocket. Since the waves which energize the stator windings are sawtooth in shape, the wave which is induced in the rotor winding will be a combination of a sawtooth wave and a compensatory wave proportional to the film speed. The induced waves may then be passed to the deflection amplifier 86, the output of which energizes the vertical deflection coils 87 of the cathode ray tube 88 producing the flying spot of light. Thus, compensation for the speed of the film is accomplished regardless of the type of motion with which the film is pulled down.

It will be appreciated that the rotor could be made in the form of a plurality of windings disposed a predetermined number of electrical degrees apart and that the stator could be fixed and the rotor windings could be energized with the 3-phase or multiphase currents and that the deflecting wave could be derived from the stator winding. This is not, however, a preferred arrangement and the illustrated arrangement comprises the more preferred embodiment of this particular type of deflection generator.

It will be appreciated that the showing of the use of a 3-phase system is purely illustrative and that arrangements embodying a different number of phases could be used. A large number of phases could be used although difficulties may then be encountered in the generator of a multiphase sawtooth waveform of this nature.

Similarly, an electrostatic arrangement could be used rather than an electromagnetic arrangement such as shown in Figure 7 and a plurality of stator plates could be charged in what would essentially be a multiphase arrangement and a rotor plate could be revolved adjacent the stator plates. Again, this is not considered a preferred embodiment of this general type of deflection generator.

What I claim is:

1. In film scansion apparatus for scanning an image recorded on a film, means for producing a spot of light of elementary cross-sectional area, means for directing the spot of light onto the film, means for moving the spot in at least one coordinate of motion, means for moving said film along a path of travel substantially in alignment with said coordinate of spot motion, movable electrical means, means for moving said movable electrical means at a speed bearing a definite and constant relationship to the instantaneous speed of linear movement of the film thereby to develop a wave form whose value is related to the instantaneous speed of linear film movement, and means to utilize the developed wave form as a compensating wave form to influence the speed of movement of the light spot in its coordinate of motion while the film is moving.

2. In film scansion apparatus, means to produce a cathode ray beam and to direct the beam toward a target element to develop a spot of light of elemental cross-sectional area, means for deflecting the beam to move the spot of light developed by the beam, an intermittently-acting film driving member positioned so that film is fed at a position whereby the spot of light may be directed onto the film, a pick-up coil member, means supplying electromagnetic flux in the vicinity of the coil member, means driven by the film driving member for altering the flux linkage with the coil member in direct and sole accordance with the driving motion actually extended to said film whereby voltage is induced in the coil member and means for utilizing the induced voltage to affect the deflection rate of the cathode ray beam.

3. Apparatus in accordance with claim 2 wherein the coil member comprises an armature and the means supplying electromagnetic flux in the vicinity of the coil member comprise pole pieces.

4. In film scansion apparatus, means to produce a cathode ray beam and to direct the beam toward a target member to develop a spot of light having an elemental cross-sectional area, means for deflecting said beam to move the spot of light produced under the influence of the beam, means for directing the light from said light spot onto the film, movable electrical means, means for moving the film intermittently, means for moving said movable electrical means at a speed bearing a definite relationship to the speed of movement of the film, means to electrically energize said movable electrical means to develop a substantially sawtoothed shaped wave form while the film is at rest and to develop a wave form while the film in in motion which is combined sawtooth shaped wave form and a compensatory wave form proportional to the speed of movement of the movable electrical means, and means for energizing said deflecting means under the influence of said developed wave forms.

5. A film scanning apparatus comprising means to develop a spot of light, means for moving the spot in at least one co-ordinate of motion, means to direct the spot of light onto a film to be scanned, means for moving said film intermittently, a yoke member having an air gap therein, means supplying electromagnetic flux to said yoke member in the region of the air gap, a first magnetically permeable member coupled to the pull down mechanism for the film and positioned in the air gap, a second magnetically permeable member positioned in the air gap, means for driving the second member at a substantially uniform rate, and electrical means influenced by the electromagnetic flux supplied to the air gap for developing a signal in response to changes in the flux passing through the air gap.

6. Apparatus in accordance with claim 5 wherein said second magnetically permeable member has a peripheral shape that is substantially an exponential curve.

7. Apparatus in accordance with claim 6 wherein the first magnetically permeable member comprises a vane-like member.

8. In film scansion apparatus, means for producing a cathode ray beam, means for directing said produced beam onto a target to develop a spot of light of elemental cross-sectional area, means for deflecting said beam, means to direct the light from said light spot onto the film, means for moving the film intermittently, a stator member, a rotor member positioned so as to be within the field of influence of said stator member, means for energizing said stator member with electrical waves, means to move said rotor member at a speed proportional to the speed of movement of the film to induce therein electrical waves representative of the speed of movement of the film, and means for utilizing the currents developed within said rotor with said deflection apparatus to influence the deflection of the cathode ray beam.

9. Apparatus in accordance with claim 8 wherein the stator member comprises a plurality of coils disposed a predetermined number of electrical degrees with respect to each other and wherein each of said coils is energized by waves of one phase supplied from a multiphase wave source.

10. Apparatus according to claim 1 wherein said film motion along said path of travel is intermittent in nature comprising alternate periods of travel and halt.

11. Apparatus according to claim 2 wherein said means for deflecting the beam to move the spot of light developed by the beam operates to deflect the beam in directions corresponding to and opposite to the direction of film motion.

12. In apparatus adapted for utilization of motion picture type film or the like, a source of rotational power, means for rigidly driving said film from said rotational power source, rotary sampling means, means coupling said sampling means to said driving means whereby to respond to the instantaneous speed of said film driving means, and electrical wave generating means coupled to said sampling means for producing an electrical voltage having a waveform which is a direct function of the instantaneous speed of linear film movement whereby the contour of said waveform becomes an index of linear film movement.

13. Apparatus according to claim 12 wherein there is additionally provided means for optically scanning areas on said film in at least one coordinate, electrically responsive means for varying the mode of optical film scansion, and means for connecting the output of said electrical wave generating means with said electrically responsive film scansion varying means whereby the mode of film scansion is rendered a function of the instantaneous speed of linear film movement.

14. Apparatus according to claim 13 wherein said optical scanning means is of the television variety adapted to develop a video signal in accordance with images recorded on said film and wherein said coordinate of scansion is in alignment with the line of film movement.

FRANK J. SOMERS.

REFERENCES CITED

The following references are of record in the file of this patent:

UNITED STATES PATENTS

| Number | Name | Date |
| --- | --- | --- |
| 2,037,577 | Harries | Apr. 14, 1936 |
| 2,250,479 | Goldmark | July 29, 1941 |
| 2,523,156 | Somers | Sept. 19, 1950 |

FOREIGN PATENTS

| Number | Country | Date |
| --- | --- | --- |
| 537,352 | Great Britain | June 18, 1941 |